UNITED STATES PATENT OFFICE.

CORNELIUS O'SULLIVAN, OF BURTON-ON-TRENT, COUNTY OF STAFFORD, ENGLAND, AND MARCELLUS BAILEY, OF WASHINGTON, DISTRICT OF COLUMBIA, ADMINISTRATOR OF WM. G. VALENTIN, DECEASED; SAID BAILEY, ADMINISTRATOR, ASSIGNOR TO SAID O'SULLIVAN; SAID O'SULLIVAN ASSIGNOR OF ONE-HALF TO WILLIAM YOUNGER & CO., OF EDINBURGH, NORTH BRITAIN.

TREATMENT OF STARCH AND STARCHY SUBSTANCES, AND THE PRODUCTION THEREFROM OF A COMPOUND BODY CAPABLE OF BEING USED AS A SUBSTITUTE FOR MALT IN BREWING, AND FOR OTHER PURPOSES.

SPECIFICATION forming part of Letters Patent No. 238,474, dated March 1, 1881.

Application filed November 29, 1880. (No specimens.) Patented in England November 12, 1874.

*To all whom it may concern:*

Be it known that I, CORNELIUS O'SULLIVAN, of Burton-on-Trent, in the county of Stafford, England, brewer, did, along with the now deceased WILLIAM GEORGE VALENTIN, of the Royal College of Chemistry, South Kensington, in the county of Middlesex, England, invent improvements in the treatment of starch and starchy substances, and the production therefrom of a compound body capable of being used as a substitute for malt in brewing, and for other purposes, (for which Letters Patent of the United Kingdom of Great Britain and Ireland, were granted to me and the said now deceased WILLIAM GEORGE VALENTIN, dated November 12, 1874, No. 3,909,) of which the following is a specification.

The said invention consists in producing from starch or starchy substances, and, by preference from rice, a compound solid body, which is termed "dextrine maltose," consisting of the same proportional quantities of dextrine and maltose as are ordinarily obtained from malt by a properly-conducted mashing process, and which is capable of being employed with great advantage as a substitute, or partial substitute, for malt in brewing, and for other purposes.

When rice is employed for the purposes of this invention it should be husked and finely ground. The rice-meal (or meal of any other starchy substance, as the case may be) is introduced gradually, and with constant stirring, into acidulated boiling water in the proportion of one hundred parts, by weight, of the former to two hundred and fifty parts, by weight, of the latter. To obtain the acidulated water, concentrated sulphuric acid is added to water in the proportion of one and a half to two or three parts per cent. For these purposes an ordinary mash-tun, or other suitable vessel, made either of wood or iron, or of any suitable material or materials capable of resisting the action of dilute sulphuric acid, may be employed, such mash-tun or receptacle being provided with steam-coils, by which the requisite amount of heat is furnished, and also with stirring apparatus, as will be well understood.

In carrying out the transformation or conversion of the starch into dextrine and maltose in accordance with and by means of the said invention, it is necessary that the process of conversion shall be arrested when the liquid contains in solution the requisite proportions of maltose and dextrine. A tolerably accurate knowledge of the progress of the conversion may be obtained by ascertaining from time to time the specific gravity of the liquid, provided the same quantities of starch or of starchy substances and of acidulated water be invariably employed, and also provided that the real amount of the substances which are capable of being dissolved out from the starch or starchy substances employed at the required stage of transformation be once for all positively determined experimentally by any of the methods hereinafter mentioned. The proper proportional quantities of dextrine and maltose can be accurately ascertained by taking a sample of the acid liquid, neutralizing the free acid with baryta-water, filtering, determining the specific gravity of the filtrate, (from which the total amount of matter in any given volume can be found by known methods,) and then estimating by known means how much oxide of copper contained in a Fehling's copper solution is reduced to sub-oxide by a known weight or measure thereof. The conversion is completed if the quantity thus reduced indicates forty-four per cent., or thereabout, of glucose calculated on the solid matter derived from the starch of the substance employed and contained in a known weight or measure of the solution taken. This reduction is tantamount to sixty-six per cent., or thereabout, of maltose. It is found that it is most expeditious, after digesting for a short time, to take, from time to time, a sample of the infused substance to neutralize with baryta-water, and to filter, and thus obtain a perfectly-clear filtrate. The specific gravity of the filtrate is next ascertained accurately by weighing in a specific-gravity bottle, or by any of the other known means and appliances capable of giving sufficiently-accurate results, and determine the optical activity of the solution. The transformation is complete if the specific rotatory power of the substance in solution for the transition-tint be 171°, or thereabout. (A slightly lower, rather than a higher, angle being preferred.) When this point is reached the whole of the acid liquid in the mash-tun should be neutralized as speedily as possible by means of finely-divided chalk in sufficient quantity to neutralize about ninety per cent. of the free acid, completing the operation by the use of milk of lime, or the neutralization may be effected by means of milk of lime alone. The liquid should be rendered as nearly neutral as possible before evaporation, but should on no account be left with a preponderance of alkali, and in actual practice it will be found most advantageous to leave the liquid slightly acid. The liquid having been treated as before described, and freed from the precipitated calcic sulphate and insoluble portions of the starch or starchy substances, is next evaporated, either in vacuum-pans or by any other suitable means, until the compound body retains only from four to five per cent., or thereabout, of moisture, when, on being cooled rapidly under the diminished pressure in the vacuum-pans, it acquires a crumbly, sticky, semi-crystalline condition, and can, by means of stirring apparatus added for this purpose to the ordinary vacuum-pans, be removed from the latter. The compound body thus obtained, which is termed "dextrine maltose," contains the same substances and in the same proportions which the starch of malt yields to the wort in the ordinary mashing process; but as such proportions are capable of being varied in the process of mashing malt, so can they be varied in the preparation of this saccharine compound body without in any way detracting from the object and intentions of this invention.

In packing the saccharine compound which forms the subject of this invention care should be taken that it shall be prevented from attracting or absorbing moisture.

It is to be observed that the several proportions of materials and substances hereinbefore referred to must be considered as closely approximative only, as they may be modified and varied within moderate limits, as will be understood by persons conversant with such operations and processes, without departing from the main principles of this invention.

It is also to be observed, in conclusion, that no claim is here broadly made to treating starchy substances with acidulated water with a view to the conversion of starch into sugar.

We claim—

Treating starch and starchy substances, and the production thereby of a compound body consisting of the same proportional quantities of dextrine and maltose as are obtained from malt in the ordinary mashing process.

In testimony whereof we have signed our names to this specification in the presence of two subscribing witnesses.

CORNELIUS O'SULLIVAN. [L. S.]
MARCELLUS BAILEY,
*Admr. of estate of Wm. George Valentin, decd.*

Witnesses to signature of Cornelius O'Sullivan:

JAMES O'SULLIVAN,
  4 *Scalpcliff Terrace, Burton-on-Trent.*
FREDRIC WILLIAM TOMPSON,
  4 *Moor Street, Burton-on-Trent.*

Witnesses to signature of Marcellus Bailey:

EWELL A. DICK,
N. C. LANE.